(12) United States Patent
Ben Ahmed et al.

(10) Patent No.: US 10,336,193 B2
(45) Date of Patent: Jul. 2, 2019

(54) WASTE HEAT UTILIZATION SYSTEM FOR AN ELECTRIC VEHICLE

(71) Applicant: Mahle International GmbH, Stuttgart (DE)

(72) Inventors: Fahmi Ben Ahmed, Stuttgart (DE); Matthias Jung, Stuttgart (DE); Sascha Lindauer, Schorndorf (DE); Hans-Ulrich Steurer, Stuttgart (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 15/878,394

(22) Filed: Jan. 23, 2018

(65) Prior Publication Data

US 2018/0208061 A1   Jul. 26, 2018

(30) Foreign Application Priority Data

Jan. 25, 2017   (DE) .......................... 10 2017 201 206

(51) Int. Cl.
*B60H 1/00* (2006.01)
*B60L 1/02* (2006.01)
(Continued)

(52) U.S. Cl.
CPC ............ *B60L 1/02* (2013.01); *B60H 1/00278* (2013.01); *B60L 1/003* (2013.01); *B60L 11/1874* (2013.01);
(Continued)

(58) Field of Classification Search
CPC ..... B60L 1/02; B60L 11/1875; B60L 11/1874
See application file for complete search history.

(56) References Cited

FOREIGN PATENT DOCUMENTS

| DE | 102011016070 A1 | 10/2012 |
|---|---|---|
| DE | 102012108043 A1 | 5/2014 |

OTHER PUBLICATIONS

German search report dated Jul. 10, 2018.
English Abstract for DE102011016070.
English Abstract for DE102012108043.

*Primary Examiner* — Ana M Vazquez
(74) *Attorney, Agent, or Firm* — Fishman Stewart PLLC

(57) ABSTRACT

A waste heat utilization system may include an air conditioning circuit for air conditioning a vehicle interior of the electric vehicle, wherein a working medium may circulate in the air conditioning circuit, which may have arranged therein a compressor for compressing the working medium, a condenser for condensing the working medium, and an evaporator for evaporating the working medium. The system may also include a cooling circuit for cooling at least one of the electric motor and the battery, wherein a coolant may circulate in the cooling circuit, which may have arranged therein the electric motor in a first branch and the battery in a second branch fluidically connected in parallel with the first branch, a first heat exchanger for discharging heat from the coolant into surroundings of the waste heat utilization system, a first delivery device for driving the coolant in the cooling circuit, a first chiller via which heat may be transferrable from the first branch into the air conditioning circuit, and a second chiller via which heat may be transferrable from the second branch into the air conditioning circuit. The system may further include a heating circuit, in which a heating medium circulates, and in which a second delivery device for driving the heating medium and a second heat exchanger for giving off heat from the heating medium into the vehicle interior may be arranged. The condense may be an indirect heat exchanger via which heat is transferrable from the air conditioning circuit into the heating circuit.

20 Claims, 6 Drawing Sheets

(51) Int. Cl.
*B60L 11/18* (2006.01)
*B60L 1/00* (2006.01)
(52) U.S. Cl.
CPC ....... *B60L 11/1875* (2013.01); *B60L 2240/34* (2013.01); *B60L 2240/36* (2013.01); *B60L 2240/425* (2013.01); *B60L 2240/545* (2013.01); *Y02T 10/7005* (2013.01)

WASTE HEAT UTILIZATION SYSTEM FOR AN ELECTRIC VEHICLE

CROSS-REFERENCE TO RELATED APPLICATIONS

This application claims priority to German Patent Application No. DE 10 2017 201 206.4, filed on Jan. 25, 2017, the contents of which are incorporated herein by reference in its entirety.

TECHNICAL FIELD

The present invention relates to a waste heat utilization system for an electric vehicle and to an electric vehicle with such a waste heat utilization system.

BACKGROUND

In electric vehicles, i.e. in vehicles that are driven electrically, the rechargeable battery that is present for driving the electric motor is utilised for supplying various auxiliary units, i.e. electric consumers, with electric energy. Since in electric vehicles no waste heat generated by an internal combustion engine is available for heating the vehicle interior, an electrically operated heating device is required which likewise draws its electric power required for the operation from the battery of the electric vehicle. However, this electric energy is no longer available for driving the electric motor, which can significantly reduce the range of the electric vehicle.

SUMMARY

It is therefore an object of the present invention to create a waste heat utilization system for an electric vehicle with which the problem explained above does no longer occur or only to a greatly limited degree. In particular it is an object of the present invention to show new ways in the development of waste heat utilization systems for electric vehicles.

According to the invention, this problem is solved through the subject of the independent patent claims. Advantageous embodiments are subject of the dependent patent claims.

Accordingly, the basic idea of the invention is to integrate the cooling circuit that is present in the electric vehicle for cooling the battery and the electric motor together with an air conditioning circuit that is present in the electric vehicle for tempering the vehicle interior in a waste heat utilization system in such a manner that the waste heat created by the battery and/or by the electric vehicle can be utilised in order to heat the vehicle interior when required but can otherwise be also effectively discharged into the surroundings of the electric vehicle. In the case that the waste heat from the electric motor and/or the battery is to be used for heating the vehicle interior, the waste heat utilization system according to the invention, following the operative principle of a heat pump, can provide heat from the cooling circuit for cooling electric motor or battery.

A waste heat utilization system for an electric vehicle according to the invention, which has an electric motor for driving the electric vehicle and a battery for supplying the electric motor with electric energy, comprises an air conditioning circuit for air conditioning the vehicle interior of the electric vehicle. In the air conditioning circuit a working medium circulates during the operation of the waste heat utilization system. In the air conditioning circuit, a compressor for compressing the working medium, a condenser for condensing the working medium and an evaporator for evaporating the working medium are arranged.

Furthermore, the waste heat utilization system comprises a cooling circuit for cooling the electric motor and the battery. During the operation of the waste heat utilization system, a coolant circulates in the cooling circuit. In the cooling circuit, the electric motor and the battery are arranged, wherein the electric motor is arranged in a first branch of the cooling circuit and the battery in a second branch of the cooling circuit, which is fluidically connected in parallel with the first branch. In the cooling circuit, a first heat exchanger for discharging heat from the coolant into the surroundings of the waste heat utilization system and a first delivery device for driving the coolant in the cooling circuit are additionally arranged. Furthermore, a first chiller is arranged in the cooling circuit, by means of which heat from the first branch of the cooling circuit is transferrable into the air conditioning circuit. Likewise, a second chiller is arranged in the cooling circuit by means of which heat from the second branch of the cooling circuit is transferrable into the air conditioning circuit. Apart from this, the waste heat utilization system is equipped with a heating circuit in which a heating medium circulates. In the heating circuit, a second delivery device for driving the heating medium and a second heat exchanger for giving off heat from the heating medium into the vehicle interior of the electric vehicle are arranged.

By means of the two chillers, waste heat of the electric motor or of the battery can be transferred into the air conditioning circuit. The heat introduced in the air conditioning circuit in this way can be passed on to the vehicle interior via the second heat exchanger if required, in order to heat the same. In the case that such heating of the vehicle should not take place, the waste heat can be emitted to the surroundings of the waste heat utilization system or of the electric vehicle by means of the first heat exchanger arranged in the cooling circuit.

According to the invention, the condenser that is present in the air conditioning circuit is designed as indirect heat exchanger, by means of which heat can be transferred from the air conditioning circuit into the heating circuit. In this way, a high temperature comfort in the vehicle interior can be achieved in different operating states with highly diverse operating parameters and in different ambient circumstances with different ambient parameters—such as for example said ambient temperature in the vehicle interior—with low consumption of electric energy. In addition to this, the waste heat utilization system introduced here makes possible using the battery as heat accumulator for buffer-storing waste heat. If for example the battery is charged with the help of an electric charging station, the temperature of the battery, upon suitable activation of the charging process, can be increased to a high but still permissible level. Because of the high mass of the battery and the high heat capacity connected with this, a substantial amount of heat can thus be stored in the battery. This heat that is buffer-stored in the battery can be introduced into the vehicle interior at a later time, typically with the electric vehicle in driving mode, by means of the waste heat utilization system according to the invention, in order to temper said vehicle interior.

According to a preferred embodiment, the first direct heat exchanger can be designed in such a manner that it can be incorporated in the cooling circuit or in the heating circuit. When heat is to be discharged from the cooling circuit into the surroundings of the waste heat utilization system, the first heat exchanger can be incorporated in the cooling circuit. When by contrast heat from the heating circuit is to be discharged into the surroundings of the waste heat utilization system, the first heat exchanger can be incorporated in the heating circuit. This can be the case, for example, when excess heat is present in the heating circuit which is not to be introduced into the vehicle interior. With this embodiment it is thus not necessary to provide a separate heat exchanger each for the cooling circuit and also for the heating circuit. This is accompanied by significant cost savings. It is conceivable with a further development of this embodiment to fluidically interconnect the first heat exchanger with the cooling circuit and with the heating circuit in such a manner that it is incorporated in both the heating circuit and also the cooling circuit.

Particularly preferably, a first operating state is adjustable in the waste heat utilization system. The first operating state primarily serves in order to ensure on the one hand, the required cooling of the battery at high ambient temperatures and, on the other hand, also cool the vehicle interior by means of the air conditioning circuit. Heating the vehicle interior, by contrast, is not the aim in the first operating state. In the first operating state, the second chiller therefore transfers the waste heat given off by the battery to the coolant from the coolant to the working medium. The condenser arranged in the air conditioning circuit and designed as indirect heat exchanger transfers this heat at least partly from the working medium on to the heating medium. Since because of the high ambient temperature a heating of the vehicle interior is not required, the first direct heat exchanger is incorporated in the heating circuit for discharging heat into the surroundings of the waste heat utilization system, so that it is flowed through by the heating medium. By way of the first direct heat exchanger, heat from the heating medium can thus be emitted to the surroundings of the waste heat utilization system. The second heat exchanger arranged in the heating circuit, which serves for transferring the vehicle interior, is fluidically bridged or deactivated so that no heating medium flows through this heat exchanger.

Likewise, the first chiller is fluidically bridged also in the first operating state, so that in the first chiller no heat exchange takes place between the air conditioning circuit and the cooling circuit. The waste heat generated by the electric motor if applicable is therefore emitted to the surroundings of the electric vehicle via the first direct heat exchanger. The evaporator that is present in the air conditioning circuit is flowed through by the working medium for absorbing heat from the vehicle interior of the electric vehicle. By means of the mentioned measures, the desired cooling of the battery and of the vehicle interior is achieved.

In a further preferred embodiment, a second operating state is adjustable in the waste heat utilization system. Typically, the waste heat utilization system is in the second operating state when the electric vehicle with the waste heat utilization system with high ambient temperatures is connected to an electric charging station for charging the electric battery. In this case, waste heat is generated by the battery but not by the electric motor or only to a minor degree. Since at high ambient temperatures a heating of the vehicle interior is not required, the second operating state is primarily designed in order to discharge the heat generated by the battery during the course of the charging process into the surroundings of the electric vehicle. In the second operating state, the second chiller therefore transfers heat from the coolant to the working medium, and the condenser arranged in the air conditioning circuit transfers this heat at least partly further on from the working medium to the heating medium. In the second operating state, the first direct heat exchanger is also integrated in the heating circuit for discharging heat from the heating circuit into the surroundings of the waste heat utilization system, so that it is flowed through by the heating medium. The second heat exchanger arranged in the heating circuit, just as with the first operating state, is bridged or deactivated also in the second operating state so that no heating medium flows through this heat exchanger. Likewise, the first chiller is fluidically bridged or deactivated so that no heat exchange takes place between the air conditioning circuit and the cooling circuit. Since typically no vehicle occupant is present in the vehicle interior during the charging process of the electric battery, no cooling of the vehicle interior by means of the air conditioning circuit is required even at high ambient temperatures. For this reason, the evaporator, in the second operating state—in contrast with the previously explained first operating state, is also fluidically bridged and deactivated in this way, so that no working medium can flow through the evaporator. Thus, no heat is transferred from the vehicle interior to the working medium of the air conditioning circuit either.

Since the electric vehicle for charging the battery is connected to the charging station, i.e. parked off, the electric motor typically does not generate any waste heat or only a negligible small amount. For this reason, it is proposed with an advantageous further development, to prevent, in the second operating state, coolant flowing through the first part branch of the cooling circuit, preferentially by means of a controllable valve device.

According to a further preferred embodiment, a third operating state is adjustable in the waste heat utilization system. The third operating state is typically adjusted in the waste heat utilization system in particular when the battery, as with the second operating state, has to be cooled typically during a charging process. In contrast with the second operating state, the third operating state is thus primarily employed when the ambient temperature of the surroundings of the electric vehicle or of the waste heat utilization system is significantly lower than with the first operating state, so that the vehicle interior in contrast with the second operating state is to be heated. In this way it is ensured that following completion of the charging process the vehicle interior is already suitably tempered. In the third operating state, the second chiller transfers heat from the coolant to the working medium, and the condenser arranged in the air conditioning circuit transfers heat from the working medium to the heating medium. With this embodiment, the evaporator arranged in the air conditioning system is flowed through by the working medium for absorbing heat from the vehicle interior of the electric vehicle. In contrast with the second operating state, the second direct heat exchanger arranged in the heating circuit is flowed through by the heating medium in the third operating state so that heat to be passed on to the vehicle interior is extracted from the heating medium in the second heat exchanger. In this way, the vehicle interior is heated as desired. Excess heat, which is not needed for tempering or heating the vehicle interior, can be emitted to the surroundings of the waste heat utilization system by means of the second direct heat exchanger analogously to the second operating state.

Particularly practically, the first direct heat exchanger can be switched into the heating circuit in the third operating state if required for discharging heat from the heating circuit into the surroundings of the waste heat utilization system.

According to a further preferred embodiment, a fourth operating state is adjustable in the waste heat utilization system. The fourth operating state is typically adjusted in particular when the vehicle interior is to be heated by means of waste heat generated by the electric motor at very low ambient temperatures, typically of 10° C. or less. Typically, the fourth operating state is thus adjusted in the driving mode of the electric vehicle at low ambient temperatures. In the fourth operating state, the first chiller transfers heat which is generated by the electric motor and absorbed in the cooling circuit, from the coolant to the working medium. The second chiller is deactivated so that no heat is transferred in the same from the coolant to the working medium. In this embodiment, the condenser arranged in the air conditioning circuit transfers heat from the working medium to the heating medium. The evaporator arranged in the air conditioning circuit, by contrast, is fluidically bridged or deactivated so that no working medium flows through the evaporator. In the fourth operating state, an undesirable cooling of the vehicle interior by the air conditioning circuit is prevented in this way. The second direct heat exchanger arranged in the heating circuit is flowed through by the heating medium in this embodiment, so that heat for giving off to the vehicle interior is extracted from the heating medium in the third heat exchanger.

According to a further preferred embodiment, a fifth operating state is adjustable in the waste heat utilization system. The fifth operating state is typically adjusted in particular when the vehicle interior at very low ambient temperatures, typically of 10° C. and less, is to be heated with waste heat generated by the battery. Typically, the fifth operating state is thus adjusted in a parked-off state of the electric vehicle, for example shortly after the parking-off of the vehicle, with low ambient temperatures at the same time. In this scenario and following the operative principle of a heat accumulator, the waste heat generated in the driving mode is at least temporarily stored in the battery which, because of its high mass, also has a high heat capacity.

In the fifth operating state, the second chiller transfers heat from the coolant to the working medium. By contrast, the first chiller is deactivated because of the switched-off electric motor, so that no heat is transferred from the coolant to the working medium. The condenser arranged in the air conditioning circuit in this embodiment transfers heat from the working medium to the heating medium. The evaporator arranged in the air conditioning circuit, by contrast, is fluidically bridged so that no working medium flows through the evaporator. An undesirable cooling of the vehicle interior by means of the air conditioning circuit in the fifth operating state is avoided in this way. The second direct heat exchanger arranged in the heating circuit is flowed through by the heating medium so that heat to be passed on to the vehicle interior is extracted from the heating medium in the third heat exchanger. In this way, the vehicle interior is heated as desired.

Preferably, the waste heat utilization system comprises exactly one cooling circuit with exactly one direct heat exchanger for discharging heat into the surroundings of the waste heat utilization system. In this way, the waste heat utilization system can be produced particularly cost-effectively.

The invention, furthermore, relates to an electric vehicle with an electric motor and with a battery for supplying the electric motor with electric energy. Apart from this, the electric vehicle comprises a waste heat utilization system according to the invention which was introduced above. The waste heat utilization system is operatively connected with the electric vehicle and/or the battery for discharging waste heat. The advantages of the waste heat utilization system explained above therefore apply also to the electric vehicle according to the invention.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar or functionally same components.

BRIEF DESCRIPTION OF THE DRAWINGS

It shows, in each case schematically.

DETAILED DESCRIPTION

Figure 1:
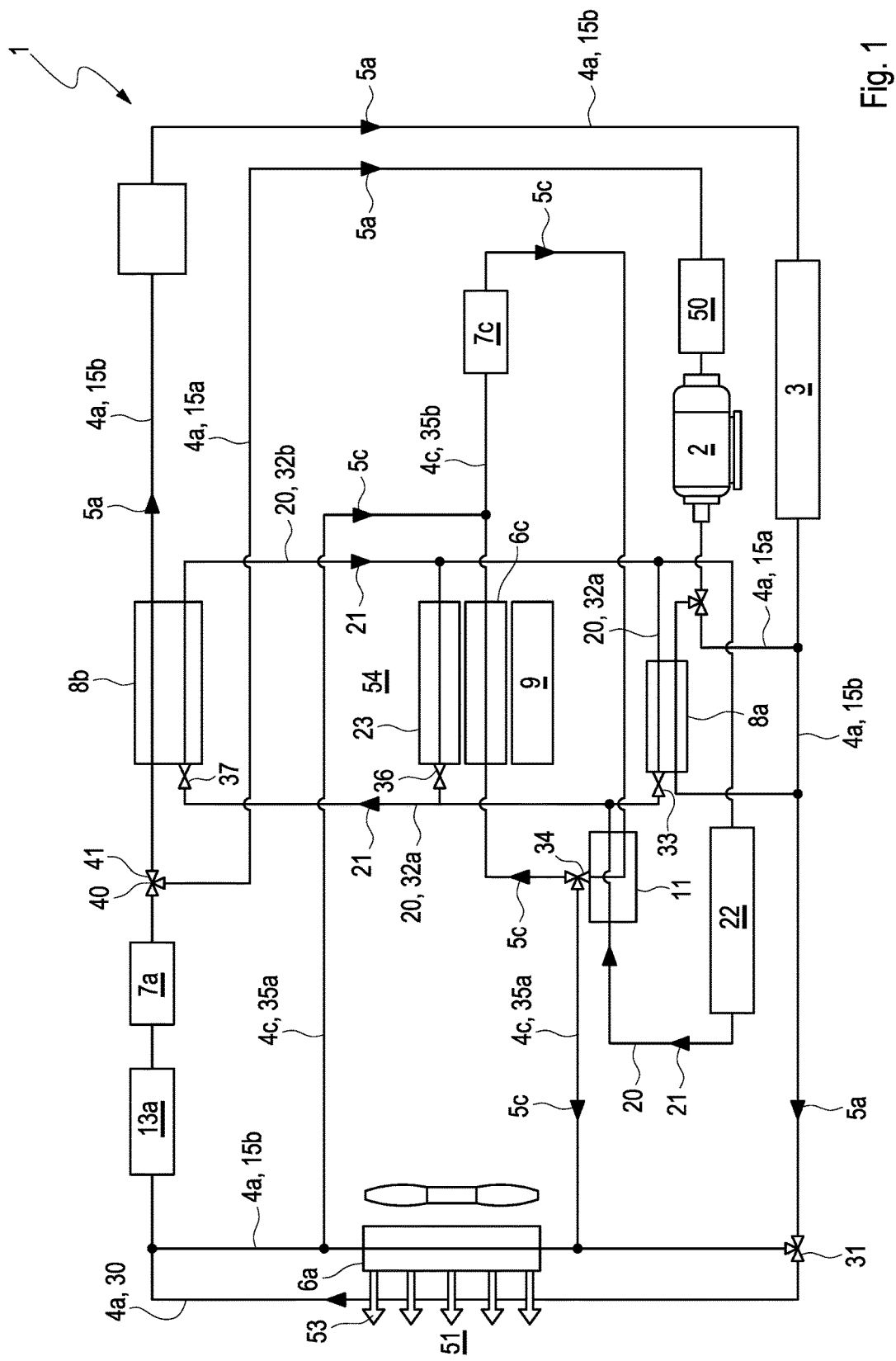
FIG. 1 an example of a waste heat utilization system according to the invention with a condenser designed as indirect heat exchanger in a circuit diagram-like representation, FIG. 2-6 the waste heat utilization system of FIG. 1 in five different operating states.

FIG. 1 exemplarily shows in a schematic, circuit diagram-like representation, the construction of a waste heat utilization system 1 according to the invention for an electric vehicle. The electric vehicle comprises an electric motor 2 for driving the electric vehicle and a battery 3 for supplying the electric motor 2 with electric energy. The battery 3 is designed rechargeable, so that in a discharged state it can be electrically recharged on an electric charging station (not shown).

The waste heat utilization system comprises an air conditioning circuit 20 for air conditioning a vehicle interior 54 of the electric vehicle, for the purpose of which in the air conditioning circuit 20 a working medium 21 circulates during the operation of the waste heat utilization system 1. In the air conditioning circuit 20, a compressor 22 for compressing the working medium 21, a condenser 11 for condensing the working medium 21, and an evaporator 23 for evaporating the working medium 21 are arranged.

The waste heat utilization system 1 furthermore comprises a cooling circuit 4a for cooling the electric motor 2 including power electronics 50, which can comprise multiple power transistors (not shown), and for cooling the battery 3. In the cooling circuit 4a, a coolant 5a circulates during the operation of the waste heat utilization system 1. Both the electric motor 2 and also the battery 3 of the electric vehicle are arranged in the cooling circuit 4a. According to FIG. 1, the electric motor 2 is arranged in a first branch 15a of the cooling circuit 5a and the battery 3 in a second branch 15b of the cooling circuit 5a. The second branch 15b in this case is connected fluidically parallel with the first branch 15a. Furthermore, in the cooling circuit 5a, a first heat exchanger 6a for discharging heat from the coolant 5a into the surroundings 51 of the waste heat utilization system 1 (see arrows 53) and a first delivery device 7a for driving the coolant 5a in the cooling circuit 4a are arranged. Furthermore, the cooling circuit 4a comprises a first chiller 8a, by means of which heat from the first branch 15a of the cooling circuit 4a can be transferred into the air conditioning circuit 20. Furthermore, the cooling circuit 4a comprises a second chiller 8b, by means of which heat can be transferred from the second branch 15b of the cooling circuit 4a into the air conditioning circuit 20. The two chillers 8a, 8b are arranged in a fluidic parallel connection. For this purpose, the first chiller 8a is arranged in a first fluid conducting path 32a and the second chiller 8b in a second fluid conducting path 32b, which is fluidically connected in parallel with the first fluid conducting path 32a.

Apart from this, the waste heat utilization system 1 comprises a heating circuit 4c, in which a heating medium 5c circulates and in which a second delivery device 7c for driving the heating medium 5c and a second heat exchanger 6c for giving off heat from the heating medium 5c into a vehicle interior 54 of the electric vehicle are arranged. The condenser 11 arranged in the air conditioning circuit 20 is designed as indirect heat exchanger, by means of which heat from the air conditioning circuit 20 can be transferred into the heating circuit 4c. The two heat exchangers 6a, 6c can be designed as conventional radiators or heat exchangers.

In the cooling circuit 4a, a compensation tank 13a for the coolant 5a can be arranged. For the coolant 5a and the heating medium 5c, the same substance can be used so that both differ only in their temperature level. Here, the heating medium 5c has a higher temperature level than the coolant 5a.

By means of an electric heating device 9, which draws electric energy from the battery 3, the vehicle interior 54 can also be electrically heated if required. The electric heating device 9 can also be provided only optionally in the waste heat utilization system 1. The electric heating device 9 can be realised in such a manner that it directly heats the air that is present in the vehicle interior 54, so that the temperature of said air increases. Alternatively to this, the electric heating device 9 can also be integrated in the heating circuit 4c, so that the heating medium 5c is heated and consequently can give off more heat to the vehicle interior 54. In this way, the temperature of the air in the vehicle interior 54 is also increased.

As is evident from FIG. 1, the direct heat exchanger 6a is designed in such a manner that it can be optionally incorporated in the cooling circuit 4a for discharging heat from the coolant 5a into the surroundings 51 or into the heating circuit 4c for discharging heat from the heating medium 4c into the surroundings 51. As is further evident from FIG. 1, a bypass line 30 with a valve device 31 is provided in the cooling circuit 5a, which fluidically bridges the first heat exchanger 6a. The valve device 31 can be designed as 3-way valve as indicated in FIG. 1.

If the first heat exchanger 6a is to be now incorporated in the heating circuit 4c, the bypass line 30 is incorporated in the cooling circuit 4c by suitably adjusting the valve device 31. A substantial advantage of such a configuration consists in that a separate expansion tank can be omitted in the heating circuit 4c.

In the example of FIG. 1, the condenser 11 arranged in the air conditioning circuit 20 is designed as indirect heat exchanger, by means of which heat can be transferred from the air conditioning circuit 20 into the heating circuit 4c.

The waste heat utilization system 1 according to FIG. 1 comprises exactly one cooling circuit 4a with exactly one direct heat exchanger 6a for discharging heat into the surroundings 51 of the waste heat utilization system 1. Accordingly, the waste heat utilization system 1 can be produced particularly cost-effectively.

Figure 2:
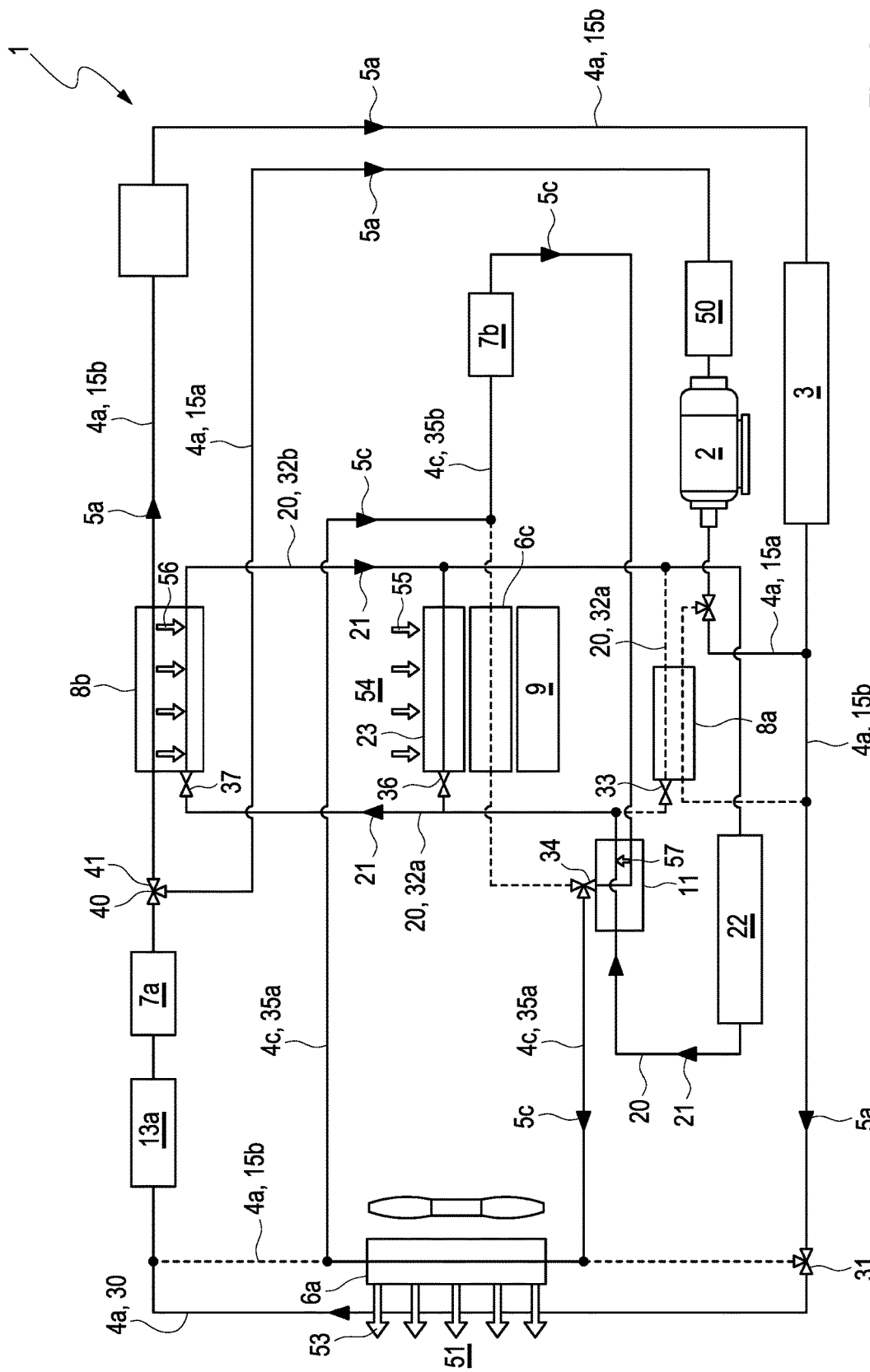

Let us now look at the representation of FIG. 2, which shows the waste heat utilization system 1 of FIG. 1 in a first operating state. Then, the waste heat utilization system 1 preferentially is in the first operating state when both the vehicle interior 54 and also the battery 3 are to be cooled at high ambient temperatures in the surroundings 51, typically of 40° C. or more. When the electric vehicle is in the driving mode, i.e. the electric motor 2 is active, the electric motor 2 has to be additionally cooled as well in the first operating state of the waste heat utilization system 1.

In the first operating state, a heat pump is realised with the help of the condenser 11, of the first heat exchanger 6a and of the second chiller 8b, with which heat can be discharged into the surroundings 51 both from the battery 3 and also from the electric motor 2 as well as from the vehicle interior 54. For cooling the battery 3, waste heat generated by the battery 3 is absorbed by the coolant 5a circulating in the cooling circuit 4a. This waste heat is at least partly transferred from the second branch 15b of the cooling circuit 4a into the air conditioning circuit 20 (see arrows 56) by means of the second chiller 8b. For this purpose, the second chiller 8b is flowed through by both the working medium 21 and also by the coolant 5a. Compared with this, the first chiller 8a is not flowed through by the working medium 21 but is deactivated. Such a deactivation of the first chiller 8a can take place by closing a controllable valve device 33 arranged in the first fluid conducting path 32a of the air conditioning circuit 20. In the first operating state of the waste heat utilization system 1 shown in FIG. 2, the valve device 33 is closed. Thus, the working medium 21 can only flow through the second fluid conducting path 32b with the second chiller 8b arranged therein. Consequently, no heat exchange takes place between the air conditioning circuit 20 and the first branch 15a of the cooling circuit 4a.

As is additionally visually confirmed in FIG. 2, heat from the cooling circuit 4a is not only absorbed by the working medium 21 via the second chiller 8b in the first operating state of the waste heat utilization system 1; but heat is also additionally absorbed from the vehicle interior 54 (see arrows 55) via the evaporator 23 in order to cool the vehicle interior 54. In the condenser 11 designed as indirect heat exchanger, heat absorbed by the working medium 21 is transferred to the heating medium 5c circulating in the heating circuit 4c (see arrow 57 in FIG. 2). For discharging heat from the cooling circuit 4a into the surroundings 51 of the waste heat utilization system 1 the direct heat exchanger 6a is incorporated in the heating circuit 4c according to FIG. 2 and decoupled from the cooling circuit 4a, so that it is flowed through by the heating medium 5c. The valve device 31 is therefore adjusted in such a manner that the coolant 5a flows through the bypass duct 30 past the direct heat exchanger 6a. Thus, the heating circuit 4c in the first operating state does not serve for heating the vehicle interior 54 but for discharging waste heat of the battery 3 and of heat from the vehicle interior 54 into the surroundings 51 of the waste heat utilization system 1. By means of the direct heat exchanger 6a, the heat absorbed by the heating medium 5c in the condenser 11 can be discharged into the surroundings 51 of the waste heat utilization system (see arrows 53) as desired in the first operating state.

The second heat exchanger 6c arranged in the heating circuit 4c is preferentially bridged by means of a further, controllable valve device 34 in such a manner that no heating medium 5c can flow through the second heat exchanger 6c. In this way, the giving off of heat from the heating medium 5c into the vehicle interior 54 that is undesirable in the first operating state is prevented.

For this purpose, the valve device 34 can be designed as a 3-way valve, by means of which the heating medium 5c leaving the condenser 11 can be conducted either in a first fluid conducing path 35a or in a second fluid conducting path 35b, which is fluidically connected in parallel with the first fluid conducting path 35a. In the first fluid conducting path 35a, the first direct heat exchanger 6a is arranged. The second direct heat exchanger 6c is arranged in the second fluid conducting path 35b. In the first operating state according to FIG. 2, the valve device 34 is adjusted in such a manner that the heating medium 5c can exclusively flow through the first fluid conducting path 35a. Since no heating capacity is to be provided by the electric heating device 9 in the vehicle interior 54, the same can be switched off in the first operating state so that it does not draw any electric energy from the battery 3.

Figure 3:
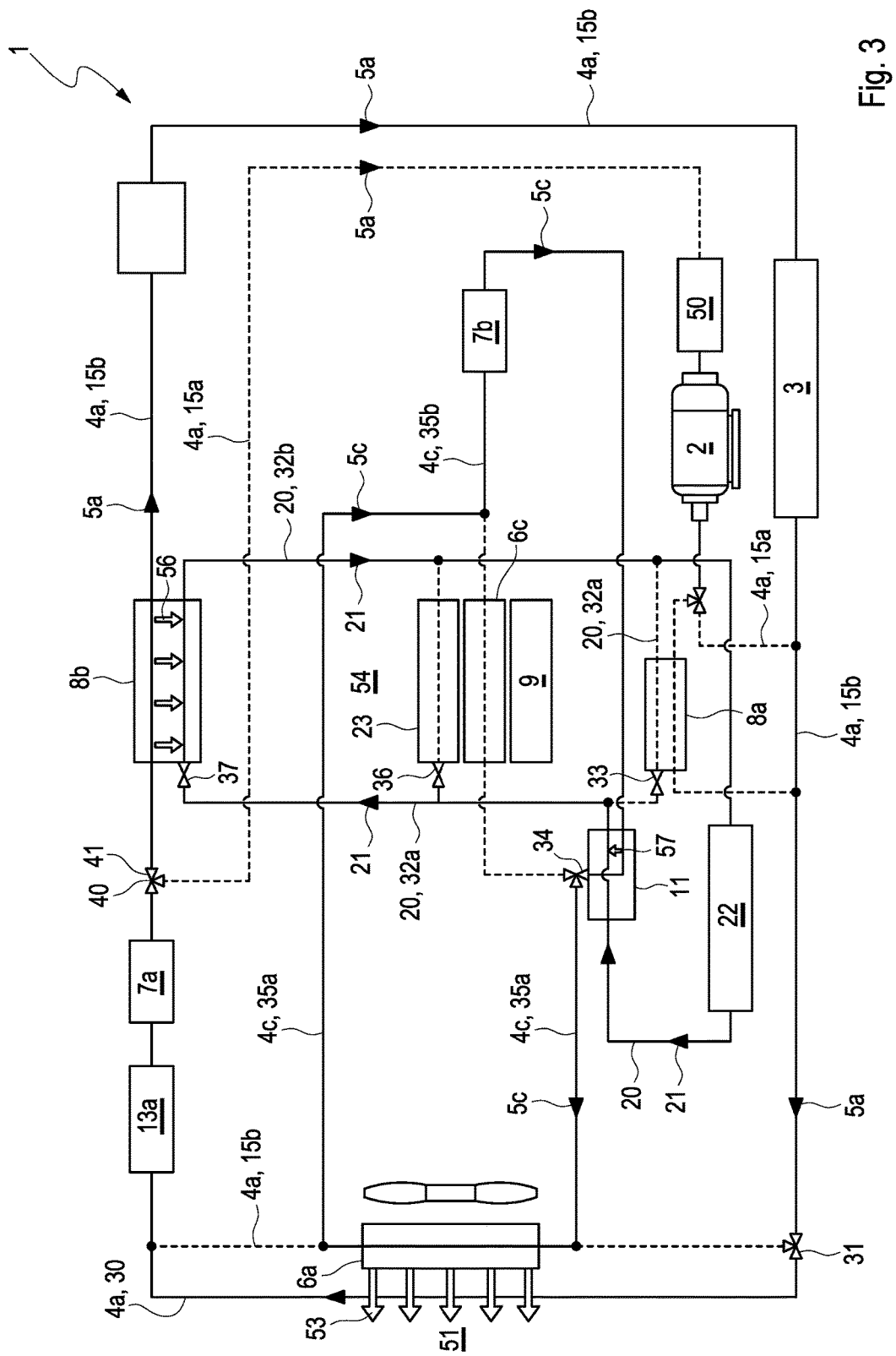

Let us now pay attention to the representation of FIG. 3. FIG. 3 shows the waste heat utilization system 1 in a second operating state that is distinct from the first operating state. This operating state is typically adjusted in the waste heat utilization system 1 in particular when the hardly or completely discharged battery 3 is to be electrically recharged on an electric charging station (not shown in the figures for the sake of clarity). In this case, the electric motor 2 of the electric vehicle parked off at the charging station is typically shut down. In addition, it is not normally required in this case to cool the vehicle interior 54 by means of the air conditioning circuit 20, since generally no vehicle occupant will be present in the vehicle interior 54 during the charging of the battery 3. Thus, the second operating state is primarily intended to serve for effectively discharging waste heat generated in the battery during the course of the electric charging process into the surroundings 51 of the waste heat utilization system 1 with the help of the waste heat utilization system 1.

Looking at the representation of FIG. 3, which shows the second operating state of the waste heat utilization system 1 in the manner of a circuit diagram, it is evident as the substantially only distinguishing feature from the first operating state, that the evaporator 23 of the air conditioning circuit 1—in contrast with the first operating state—is fluidically bridged. This means that no working medium 21 is conducted through the evaporator 23. Consequently, no heat from the vehicle interior 54 is absorbed by the working medium 21 either.

As is directly evident from FIG. 3, the evaporator 23 is fluidically connected in parallel with the second chiller 8b. Upstream or downstream of the evaporator 23, a controllable valve device 36 is arranged, which in an opened state opens the evaporator 23 so that working medium 21 can flow through and in a closed state, prevents medium working 21 flowing through the evaporator 23. In the second operating state, the controllable valve device 36 is thus adjusted into the closed state so that the working medium is conducted through the second chiller 8b connected in parallel with the evaporator 23. In the first operating state according to FIG. 2, the valve device 36 is accordingly adjusted into the opened state.

Since in the parked-off state of the electric vehicle, the electric motor 2 does not generate any waste heat, it is not required either to discharge waste heat generated by the electric motor 2 into the surroundings 51 by means of the cooling circuit 4a. Consequently, the flowing-through of the first part branch 15a of the cooling circuit 4a, in which the electric motor 2 is arranged, can be prevented in the second operating state. This can take place for example by means of a valve device 40 designed as 3-way valve, which is arranged at a junction point 41 in which the two part branches 15a, 15b of the cooling circuit 4a lead into one another. In the second operating state, the valve device 40 is adjusted in such a manner that only the second part branch 15b with the battery 3 is a part of the cooling circuit 4a, that is flowed through by the coolant 4a. The deactivation of the first part branch 15a is indicated in FIG. 3 by a dashed line representation of the same. The first chiller 8a is deactivated in the second operating state.

Figure 4:
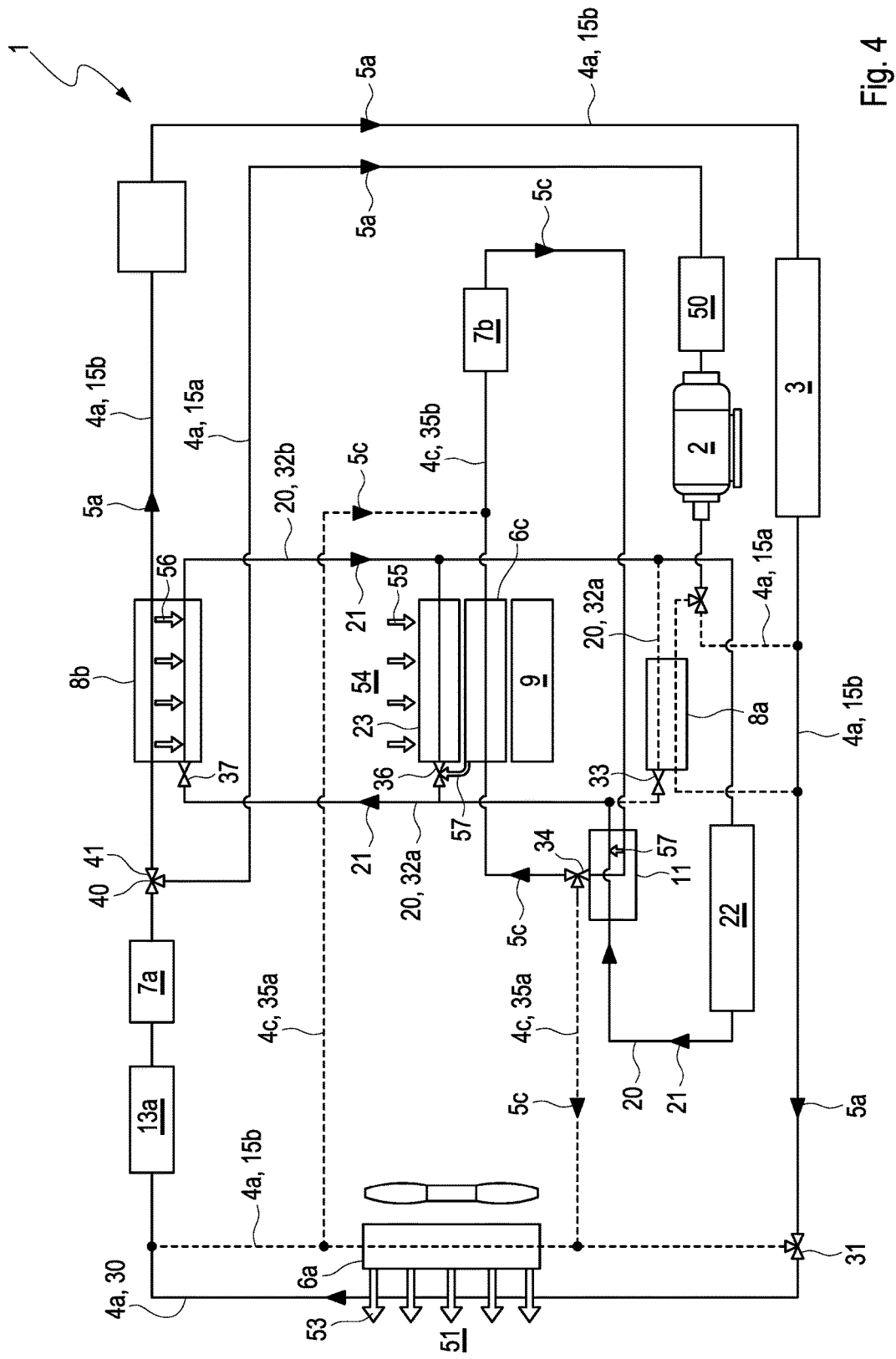

FIG. 4 shows the waste heat utilization system 1 in a further, third operating state. The third operating state is preferentially adjusted in particular when the battery 3 is to be cooled and the vehicle interior 54 heated at the same time. Typically, the ambient temperature of the surroundings 51 of the waste heat utilization system 1 in this scenario is lower than in the first and second operating state and can amount for example to approximately 15° C.

Comparing the representation of FIG. 3 with that of FIG. 4 one recognises as distinguishing feature of the third operating state with respect to the second operating state that the evaporator 23—as in the first operating state—is flowed through by the working medium 21 for absorbing heat from the vehicle interior 54 of the electric vehicle. Thus, the valve device 36 is opened in the third operating state, at least partly, preferentially completely. In this way, the vehicle interior 54 can be dehumidified. A further distinguishing feature consists in that the second heat exchanger 6c arranged in the heating circuit 4c is flowed through by the heating medium 5c. To this end, the valve device 34 is adjusted in such a manner that the heating medium 5c is conducted through the second fluid conducting path 35b. Accordingly, heat is extracted from the heating medium 5c in the second direct heat exchanger 6c and for heating the vehicle interior 54 passed on to the same (see arrow 57 in FIG. 4).

In the case that by means of the second chiller 8b more heat is transferred from the coolant 4a of the cooling circuit 8b to the working medium 21 of the air conditioning circuit 20 than is required for heating the vehicle interior 54, the first direct heat exchanger 6a can be switched into the heating circuit 4c if required for discharging excess heat from the heating circuit 5c into the surroundings 51 of the waste heat utilization system. This is indicated in FIG. 4 by a dashed-line representation of the first fluid conducting path 35a of the heating circuit 4c, in which the first direct heat exchanger 6a is arranged. Such additional activation can take place by suitably adjusting the valve device 34 in such a manner that the heating medium 5c can also enter the first fluid conducting path 35a with the first direct heat exchanger 6a. The first chiller 8a is deactivated in the third operating state.

Figure 5:
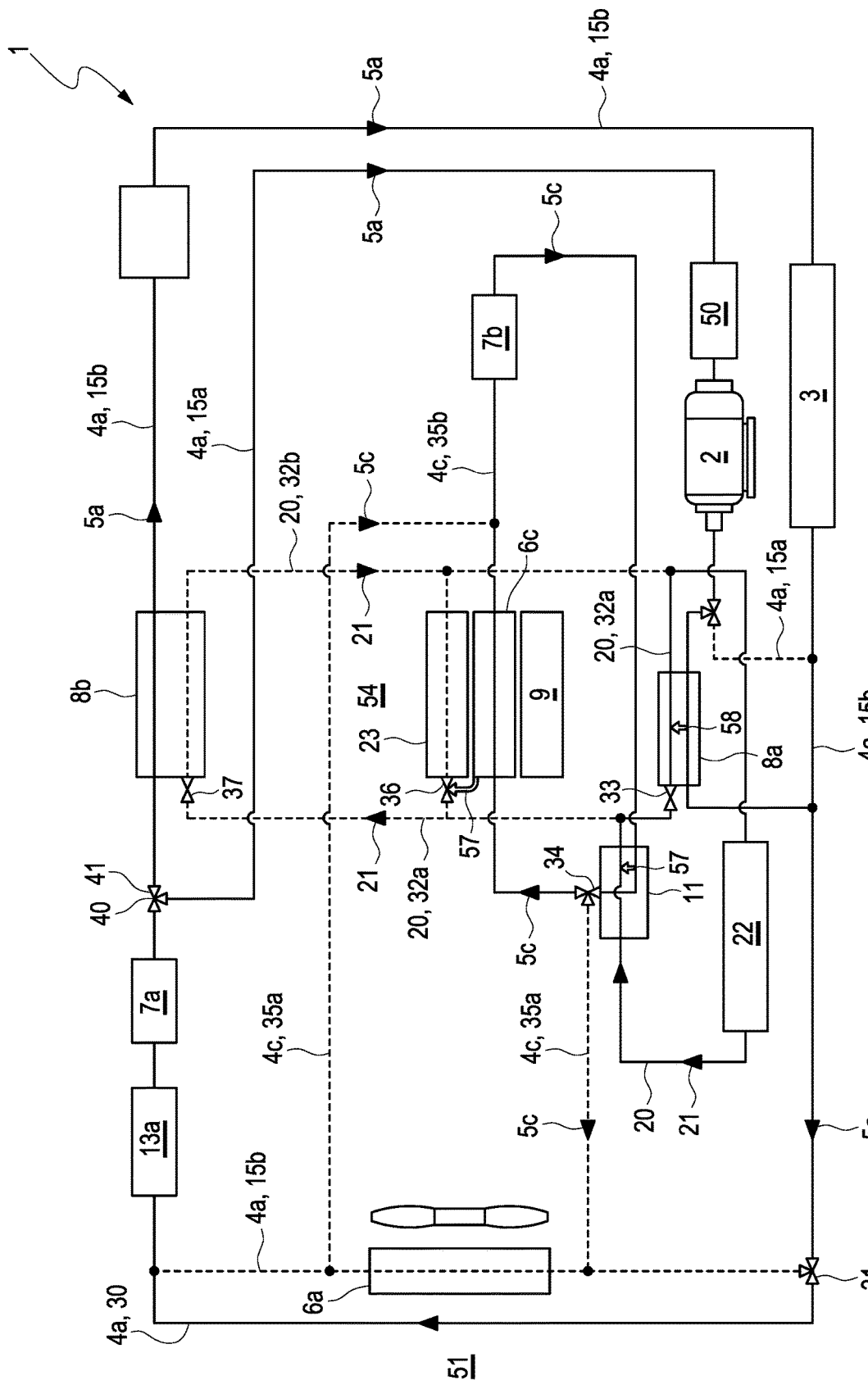

FIG. 5 shows the waste heat utilization system 1 in a further, fourth operating state. The fourth operating state is preferably adjusted in the waste heat utilization system 1 in particular when because of low ambient temperatures in the surroundings 51 of the waste heat utilization system 1, for example of approximately 10° C. or less, the vehicle interior 54 of the electric vehicle is to be heated. In the fourth operating state it is possible to transfer the waste heat generated by the electric motor 2 during the operation into the vehicle interior 54. In the fourth operating state—in contrast with the first, second and third operating state—the first chiller 8a is active. Thus, the valve device 33 is adjusted into an opened state so that the working medium 21 can flow through the first chiller 8a. The first chiller 8a then transfers the heat given off by the electric motor 2 to the coolant 5a to the working medium 21 circulating in the cooling circuit 20 (see arrow 58 in FIG. 5). Compared with this, the second chiller 8b is deactivated so that no heat is transferred from the coolant 5a to the working medium 21. For deactivating the second chiller 8b, a further controllable valve device 37 can be arranged upstream or downstream of the same. The valve device 37 is adjustable between an opened and a closed position. In the closed state according to FIG. 5, the valve device 37 prevents working medium 21 flowing through the second chiller 8b. In the first, second and third operating state, the valve device 37 is in the opened state (see FIGS. 2, 3 and 4).

Since the vehicle interior 54 is to be heated, the evaporator 23 arranged in the air conditioning circuit 20 is fluidically bridged in the fourth operating state so that no working medium 21 flows through the evaporator 23. In this way it is prevented that heat is extracted from the vehicle interior 54 to be heated. In the fourth operating state, the controllable valve device 36 is therefore adjusted into the closed state.

Apart from this, the condenser 11 arranged in the air conditioning circuit transfers the heat absorbed by the working medium 21 via the first chiller 8a at least partly on to the heating medium 5c conducted through the heating circuit 4c. Since in the fourth operating state the second direct heat exchanger 6c arranged in the heating circuit 4c is flowed through by the heating medium 5c, heat can be extracted from the heating medium 5c in the second heat exchanger 6c and passed on to the vehicle interior 54. In this way, the vehicle interior 54 can be heated as desired. In the case that the quantity of heat provided to the vehicle interior 54 by the second heat exchanger 6c is not sufficient, the electric heating device 9 can be additionally activated.

Figure 6:
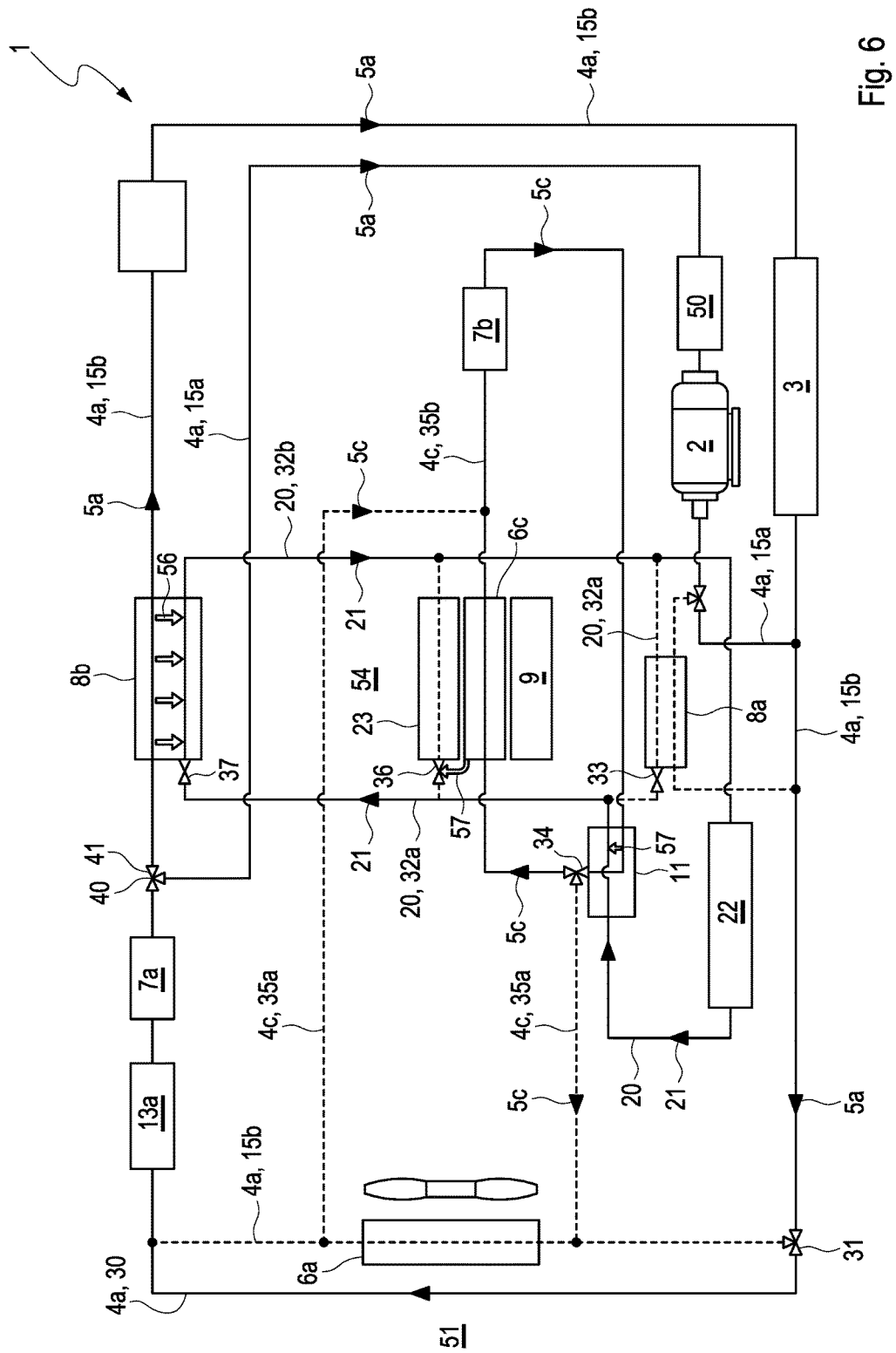

FIG. 6 shows the waste heat utilization system 1 in a further, fifth operating state. Like the fourth operating state, the fifth operating state is preferentially adjusted when because of low ambient temperatures in the surroundings 51 of the waste heat utilization system 1, for example of approximately 10° C. or less, the vehicle interior 54 of the electric vehicle is to be heated. In the fifth operating state however it is not the waste heat generated by the electric motor 2 during the operation that is transferred into the vehicle interior 54 but the heat that is stored in the battery 3.

This version is preferentially considered when the electric motor 2 has been switched off after the electric vehicle has been parked off and therefore no longer generates any waste heat that could be fed to the vehicle interior 54. Since, because of its high mass, the battery 3 typically has a very high heat capacity and can thus function as heat accumulator, the energy stored in the battery 3 can be utilised for heating the vehicle interior 54, at least within a limited scope. The fifth operating state therefore serves for the heat transfer from the battery 3 into the vehicle interior. The fifth operating state therefore differs from the fourth operating state in that on the one hand the second chiller 8b transfers heat from the coolant 5a to the working medium 21. On the other hand, the first chiller 8a is deactivated in the fifth operating state so that no heat is transferred from the coolant 5a to the working medium 21. The valve device 33 is thus in the closed state and the valve device 37 is in the opened state. The second chiller 8b thus transfers the heat given off by the battery 3 to the first coolant 5a to the working medium 21 circulating in the cooling circuit 20 (see arrows 58 in FIG. 6).

Analogous to the first operating state, the condenser 11 arranged in the air conditioning circuit 20 transfers the heat absorbed by the working medium 21 via the second chiller 8b at least partly on to the heating medium 5c conducted through the heating circuit 4c also in the fifth operating state. Since the second direct heat exchanger 6c arranged in the heating circuit 4c is also flowed through by the heating medium 5c in the fifth operating state, heat for giving off to the vehicle interior 54 can be extracted from the heating medium 5c in the second heat exchanger 6c. In this way, the vehicle interior 54 is heated as desired. In the case that the quantity of heat provided to the vehicle interior 54 by the second heat exchanger 6c is not adequate, the electric heating device 9 can be additionally activated also in the fifth operating state.

In the fourth and in the fifth operating state, the first direct heat exchanger 6a is fluidically bridged by means of the controllable valve device 31 designed as 3-way valve interacting with the bypass line 30, so that no coolant 5a and also no heating medium 5c flows through the first direct heat exchanger 6a. Accordingly, no heat can be emitted to the surroundings 51 of the waste heat utilization system 1 either.

It is to be understood that, alternatively or additionally to the five operating states explained above, further operating states which are not explained in more detail here, are adjustable in the waste heat utilization system 1 according to the invention.

For adjusting or switching-over between two or more operating states, the waste heat utilization system 1 can be equipped with a control/regulating device which is not shown in more detail in the figures, by means of which the waste heat utilization system 1 can be switched over between at least two operating states. For switching-over between the operating states, the control/regulating device can activate the previously explained valve devices 31, 33, 34, 36, 37, 40. For adjusting one of the previously explained five operating states, the valve devices 31, 33, 34, 36, 37 and 40 can be adjusted as explained above by means of suitable activation through the control/regulating device. Here, the activation or adjustment of the valve devices can be activated as a function of at least one operating parameter of the waste heat utilization system 1 such as for example the waste heat generated by the battery per unit time and as a function of at least one ambient parameter of the waste heat utilization system 1 such as for example the ambient temperature in the surroundings 51 of the waste heat utilization system 1.

"Direct heat exchanger" here is to mean a heat exchanger by means of which heat can be exchanged between the coolant 5a or the heating medium 5c and the air that is present in the surroundings 51 or in the vehicle interior 54.

The term "indirect heat exchanger" here is to mean a heat exchanger by means of which heat can be exchanged between the working medium 21 circulating in the air conditioning circuit 20 and the coolant 5a or the heating medium 5c. A direct heat exchange with the air that is present in the surroundings 51 and in the vehicle interior 54 does not take place.

"Chiller" 8a, 8b here is to mean a heat exchanger, by means of which heat can be transferred from the coolant 5a to the working medium 21 of the air conditioning circuit 20.

The invention claimed is:

1. A waste heat utilization system for an electric vehicle having an electric motor for driving the electric vehicle and a battery for supplying the electric motor with electric energy, comprising:

an air conditioning circuit for air conditioning a vehicle interior of the electric vehicle, wherein, during operation of the waste heat utilization system, a working medium circulates in the air conditioning circuit, which has arranged therein:
a compressor for compressing the working medium;
a condenser for condensing the working medium;
an evaporator for evaporating the working medium;
a cooling circuit for cooling at least one of the electric motor and the battery, wherein, during the operation of the waste heat utilization system, a coolant circulates in the cooling circuit, which has arranged therein:
the electric motor and the battery, wherein the electric motor is arranged in a first branch of the cooling circuit, and the battery is arranged in a second branch of the cooling circuit, the second branch being fluidically connected in parallel with the first branch;
a first heat exchanger for discharging heat from the coolant into surroundings of the waste heat utilization system;
a coolant driver;
a first chiller via which heat is transferrable from the first branch of the cooling circuit into the air conditioning circuit;
a second chiller via which heat is transferrable from the second branch of the cooling circuit into the air conditioning circuit;
a heating circuit, in which a heating medium circulates, and in which a heating medium driver and a second heat exchanger for giving off heat from the heating medium into the vehicle interior are arranged;
wherein the condenser is an indirect heat exchanger via which heat is transferrable from the air conditioning circuit into the heating circuit.

2. The waste heat utilization system according to claim 1 further comprising an electric heating device for electrically heating the vehicle interior.

3. The waste heat utilization system according to claim 2, wherein the waste heat utilization system is adjustable to a first operating state in which:
the condenser transfers heat from the working medium to the heating medium;
the first heat exchanger is incorporated in the heating circuit for discharging heat from the heating circuit into the surroundings of the waste heat utilization system so that the first heat exchanger is flowed through by the heating medium;
the second heat exchanger is bridged so that no heating medium flows therethrough;
the first chiller is deactivated so that no heat exchange takes place therein;
the evaporator is flowed through by the working medium for absorbing heat from the vehicle interior; and
the second chiller is flowed through by the coolant of the cooling circuit and by the working medium of the air conditioning circuit so that heat from the coolant is transferred to the working medium.

4. The waste heat utilization system according to claim 3, wherein the waste heat utilization system is adjustable to a second operating state in which:
the second chiller transfers heat from the coolant to the working medium;
the condenser transfers heat from the working medium to the heating medium;
the first heat exchanger is incorporated in the heating circuit for discharging heat from the heating circuit into the surroundings of the waste heat utilization system so that the first heat exchanger is flowed through by the heating medium;
the second heat exchanger is fluidically bridged so that no heating medium flows therethrough;
the evaporator is fluidically bridged so that no working medium flows therethrough; and
the first chiller is deactivated so that no heat exchange takes place between the air conditioning circuit and the first cooling circuit.

5. The waste heat utilization system according to claim 4, wherein the waste heat utilization system is adjustable to a third operating state in which:
the second chiller transfers heat from the coolant to the working medium and the first chiller is deactivated;
the condenser transfers heat from the working medium to the heating medium;
the evaporator is flowed through by the working medium to absorb heat from the vehicle interior; and
the second heat exchanger is flowed through by the heating medium so that heat to be passed on to the vehicle interior is extracted from the heating medium in the second heat exchanger.

6. The waste heat utilization system according to claim 5, wherein the waste heat utilization system is adjustable to a fourth operating state in which:
the first chiller transfers heat from the coolant to the working medium;
the second chiller is deactivated so that no heat is transferred from the coolant to the working medium therein;
the condenser transfers heat from the working medium to the heating medium;
the evaporator is fluidically bridged so that no working medium flows therethrough; and
the second heat exchanger is flowed through by the heating medium so that heat to be passed on to the vehicle interior is extracted from the heating medium in the second heat exchanger.

7. The waste heat utilization system according to claim 1, wherein the waste heat utilization system is adjustable to a first operating state in which:
the condenser transfers heat from the working medium to the heating medium;
the first heat exchanger is incorporated in the heating circuit for discharging heat from the heating circuit into the surroundings of the waste heat utilization system so that the first heat exchanger is flowed through by the heating medium;
the second heat exchanger is bridged so that no heating medium flows therethrough;
the first chiller is deactivated so that no heat exchange takes place therein;
the evaporator is flowed through by the working medium for absorbing heat from the vehicle interior; and
the second chiller is flowed through by the coolant of the cooling circuit and by the working medium of the air conditioning circuit so that heat from the coolant is transferred to the working medium.

8. The waste heat utilization system according to claim 1, wherein the waste heat utilization system is adjustable to an operating state in which:
the second chiller transfers heat from the coolant to the working medium;
the condenser transfers heat from the working medium to the heating medium;
the first heat exchanger is incorporated in the heating circuit for discharging heat from the heating circuit into the surroundings of the waste heat utilization system so that the first heat exchanger is flowed through by the heating medium;

the second heat exchanger is fluidically bridged so that no heating medium flows therethrough;
the evaporator is fluidically bridged so that no working medium flows therethrough; and
the first chiller is deactivated so that no heat exchange takes place between the air conditioning circuit and the first cooling circuit.

9. The waste heat utilization system according to claim 8, wherein, in the operating state, flow of the coolant through the first branch of the cooling circuit is prevented.

10. The waste heat utilization system according to claim 9, wherein the flow of the coolant through the first branch is prevented via a controllable valve device.

11. The waste heat utilization system according to claim 1, wherein the waste heat utilization system is adjustable to an operating state in which:
the second chiller transfers heat from the coolant to the working medium and the first chiller is deactivated;
the condenser transfers heat from the working medium to the heating medium;
the evaporator is flowed through by the working medium to absorb heat from the vehicle interior; and
the second heat exchanger is flowed through by the heating medium so that heat to be passed on to the vehicle interior is extracted from the heating medium in the second heat exchanger.

12. The waste heat utilization system according to claim 11, wherein, in the operating state, the first heat exchanger is switched into the heating circuit for discharging heat from the heating circuit into the surroundings of the waste heat utilization system.

13. The waste heat utilization system according to claim 1, wherein the waste heat utilization system is adjustable to an operating state in which:
the first chiller transfers heat from the coolant to the working medium;
the second chiller is deactivated so that no heat is transferred from the coolant to the working medium therein;
the condenser transfers heat from the working medium to the heating medium;
the evaporator is fluidically bridged so that no working medium flows therethrough; and
the second heat exchanger is flowed through by the heating medium so that heat to be passed on to the vehicle interior is extracted from the heating medium in the second heat exchanger.

14. The waste heat utilization system according to claim 13, wherein the first heat exchanger is bridged in the operating state so that no coolant and no heating medium flows therethrough.

15. The waste heat utilization system according to claim 1, wherein the waste heat utilization system is adjustable to an operating state in which:
the second chiller transfers heat from the coolant to the working medium;
the first chiller is deactivated so that no heat is transferred from the coolant to the working medium;
the condenser transfers heat from the working medium to the heating medium;
the evaporator is fluidically bridged so that no working medium flows therethrough; and
the second heat exchanger is flowed through by the heating medium so that heat to be passed on to the vehicle interior is extracted from the heating medium in the second heat exchanger.

16. The waste heat utilization system according to claim 15, wherein the first heat exchanger is bridged in the fifth operating state so that no coolant and no heating medium flows therethrough the first direct heat exchanger.

17. The waste heat utilization system according to claim 1, further comprising:
a regulator via which the waste heat utilization system is switchable between at least two operating states; and
a plurality of valve devices, at least one is adjustable via the regulator.

18. The waste heat utilization system according to claim 17, wherein all of the valve devices are adjustable.

19. The waste heat utilization system according to claim 1, wherein the waste heat utilization system includes exactly one cooling circuit with exactly one direct heat exchanger for discharging heat into the surroundings.

20. An electric vehicle, comprising:
an electric motor and a battery for supplying the electric motor with electric energy; and
a waste heat utilization system for discharging waste heat and that is operatively connected with at least one of the electric motor and the battery, the waste heat utilization system including:
an air conditioning circuit for air conditioning a vehicle interior of the electric vehicle, wherein, during operation of the waste heat utilization system, a working medium circulates in the air conditioning circuit, which has arranged therein:
a compressor for compressing the working medium;
a condenser for condensing the working medium;
an evaporator for evaporating the working medium;
a cooling circuit for cooling at least one of the electric motor and the battery, wherein, during the operation of the waste heat utilization system, a coolant circulates in the cooling circuit, which has arranged therein:
the electric motor and the battery, wherein the electric motor is arranged in a first branch of the cooling circuit, and the battery is arranged in a second branch of the cooling circuit, the second branch being fluidically connected in parallel with the first branch;
a first heat exchanger for discharging heat from the coolant into surroundings of the waste heat utilization system;
a coolant driver;
a first chiller via which heat is transferrable from the first branch of the cooling circuit into the air conditioning circuit;
a second chiller via which heat is transferrable from the second branch of the cooling circuit into the air conditioning circuit;
a heating circuit, in which a heating medium circulates, and in which a heating medium driver and a second heat exchanger for giving off heat from the heating medium into the vehicle interior are arranged;
wherein the condenser is an indirect heat exchanger via which heat is transferrable from the air conditioning circuit into the heating circuit.

* * * * *